(12) United States Patent
Zhakov et al.

(10) Patent No.: US 9,549,078 B2
(45) Date of Patent: Jan. 17, 2017

(54) PROXY MEDIA SERVICE FOR DIGITAL TELEPHONY

(71) Applicant: Genesys Telecommunications Laboratories, Inc., Daly City, CA (US)

(72) Inventors: Vyacheslav Zhakov, Burlingame, CA (US); Vyacheslav Valentinovich Sayko, Walnut Creek, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/566,680

(22) Filed: Dec. 10, 2014

(65) Prior Publication Data

US 2015/0092571 A1  Apr. 2, 2015

Related U.S. Application Data

(63) Continuation of application No. 12/712,935, filed on Feb. 25, 2010, now Pat. No. 8,982,735.

(51) Int. Cl.
*H04M 3/42* (2006.01)
*H04M 3/428* (2006.01)
(Continued)

(52) U.S. Cl.
CPC ............ *H04M 7/129* (2013.01); *H04L 65/105* (2013.01); *H04L 65/1006* (2013.01);
(Continued)

(58) Field of Classification Search
CPC ...... H04M 1/57; H04M 1/72558; H04M 3/42; H04W 48/02; H04W 48/08; H04W 48/16
(Continued)

(56) References Cited

U.S. PATENT DOCUMENTS 5,926,537 A * 7/1999 Birze .......................... 379/252
5,991,374 A   11/1999 Hazenfield
(Continued)

FOREIGN PATENT DOCUMENTS

| EP | 1244282 A2 | 9/2002 |
|---|---|---|
| EP | 2540068 A1 | 1/2013 |
| WO | 2011106142 A1 | 9/2011 |

OTHER PUBLICATIONS

Freeman, R.L., Fundamentals of Telecommunications, Second Edition, 2005, Excerpt of Chapter 8, pp. 169-170, 4 pages total, John Wiley & Sons, Inc., Hoboken, New Jersey.
(Continued)

*Primary Examiner* — Wutchung Chu
(74) *Attorney, Agent, or Firm* — Lewis Roca Rothgerber Christie LLP

(57) ABSTRACT

A Session Initiation Protocol (SIP) service system includes a SIP-enabled soft switch at a telephony service provider, executing code from a coupled machine-readable medium, routing SIP transactions to remote destinations, a media server coupled to the SIP-enabled soft switch storing media including ring tones and music-on-hold for use in progressing transactions, and an interface to a wide-area-network (WAN) for transmitting transactions and media. The SIP-enabled soft switch determines for each transaction from stored data whether media services are to be provided or not provided for that destination, and in the event media services are not to be provided, alters packet data to indicate media services to be provided by a server local to the destination.

12 Claims, 3 Drawing Sheets

(51) Int. Cl.
*H04L 29/06* (2006.01)
*H04M 7/12* (2006.01)
*H04M 3/56* (2006.01)
*H04M 7/00* (2006.01)

(52) U.S. Cl.
CPC ...... *H04L 65/1053* (2013.01); *H04L 65/1096* (2013.01); *H04M 3/42017* (2013.01); *H04M 3/4285* (2013.01); *H04M 3/42221* (2013.01); *H04M 3/42323* (2013.01); *H04M 3/56* (2013.01); *H04M 7/0033* (2013.01)

(58) Field of Classification Search
USPC ...................... 379/207.16, 201.01, 201.07–201.09, 379/201.12, 202.01; 370/352–356, 401; 709/227–229
See application file for complete search history.

(56) References Cited

U.S. PATENT DOCUMENTS

| | | | |
|---|---|---|---|
| 6,456,601 B1 | 9/2002 | Kozdon et al. | |
| 6,687,341 B1* | 2/2004 | Koch | H04M 3/4938 379/88.13 |
| 6,853,719 B2 | 2/2005 | McCormack | H04M 7/006 379/201.01 |
| 7,173,911 B1 | 2/2007 | Sarkar et al. | |
| 7,602,901 B1* | 10/2009 | Kates | H04M 3/02 379/373.01 |
| 7,664,237 B1* | 2/2010 | Croak | H04M 19/04 370/352 |
| 7,889,853 B2* | 2/2011 | Sutcliffe | 379/207.16 |
| 8,126,126 B2* | 2/2012 | Haley | H04M 3/42017 379/201.01 |
| 8,194,849 B2* | 6/2012 | Bosan | H04M 1/72519 379/373.02 |
| 8,200,196 B2* | 6/2012 | David | H04M 3/42017 379/164 |
| 8,213,591 B2* | 7/2012 | Belz et al. | 379/207.16 |
| 8,224,401 B1 | 7/2012 | Schlichter | |
| 8,244,229 B2* | 8/2012 | Lindfors | H04M 3/42017 348/552 |
| 8,270,573 B2* | 9/2012 | Fiorillo | H04L 63/30 379/32.01 |
| 8,275,114 B2* | 9/2012 | Jiang | H04M 3/42017 379/251 |
| 8,331,358 B2 | 12/2012 | Chang et al. | |
| 8,351,585 B2 | 1/2013 | Wu et al. | |
| 8,411,827 B2* | 4/2013 | Xu | H04M 3/42017 379/88.12 |
| 8,644,482 B2 | 2/2014 | Wu et al. | |
| 2005/0068942 A1* | 3/2005 | Chu et al. | 370/352 |
| 2006/0101098 A1 | 5/2006 | Morgan et al. | |
| 2006/0120356 A1 | 6/2006 | Lee et al. | |
| 2006/0168326 A1 | 7/2006 | Baldwin et al. | |
| 2007/0003040 A1 | 1/2007 | Radziewicz et al. | |
| 2007/0071216 A1 | 3/2007 | Shen et al. | |
| 2007/0127655 A1* | 6/2007 | Jung et al. | 379/142.01 |
| 2007/0268359 A1 | 11/2007 | Zhang et al. | |
| 2007/0286372 A1 | 12/2007 | DeMent et al. | |
| 2008/0045209 A1 | 2/2008 | Mo et al. | |
| 2008/0063168 A1* | 3/2008 | Haley | H04M 3/42017 379/201.01 |
| 2008/0095345 A1 | 4/2008 | Sharma et al. | |
| 2008/0102800 A1 | 5/2008 | Cheng et al. | |
| 2008/0192900 A1* | 8/2008 | Liu | H04M 1/57 379/87 |
| 2008/0198976 A1 | 8/2008 | Zhang et al. | |
| 2008/0212943 A1* | 9/2008 | Frohlich | H04M 3/42051 386/228 |
| 2008/0273671 A1 | 11/2008 | Miao et al. | |
| 2009/0022283 A1* | 1/2009 | Pollitt | H04M 3/42017 379/87 |
| 2009/0097471 A1 | 4/2009 | Qiu et al. | |
| 2009/0098891 A1* | 4/2009 | Park | H04M 3/42017 455/458 |
| 2009/0110171 A1* | 4/2009 | Kannan et al. | 379/207.16 |
| 2009/0116632 A1* | 5/2009 | Shen et al. | 379/207.16 |
| 2009/0119303 A1 | 5/2009 | Rio et al. | |
| 2009/0214003 A1* | 8/2009 | Yan | H04M 3/02 379/87 |
| 2009/0222457 A1 | 9/2009 | Gallant | |
| 2009/0262915 A1 | 10/2009 | Wu et al. | |
| 2010/0002849 A1 | 1/2010 | Wang et al. | |
| 2010/0061541 A1 | 3/2010 | Ke et al. | |
| 2010/0119051 A1* | 5/2010 | Belz et al. | 379/207.16 |
| 2010/0166156 A1* | 7/2010 | Xu | H04M 3/42017 379/87 |
| 2010/0303223 A1* | 12/2010 | Bushnell et al. | 379/207.16 |
| 2010/0321453 A1 | 12/2010 | Baba | |
| 2010/0323676 A1 | 12/2010 | Xu et al. | |
| 2010/0329453 A1* | 12/2010 | Mehmood et al. | 380/44 |
| 2011/0103570 A1 | 5/2011 | Gao et al. | |
| 2011/0206037 A1 | 8/2011 | Zhakov et al. | |
| 2011/0222678 A1 | 9/2011 | Ge et al. | |
| 2011/0312390 A1* | 12/2011 | Wang et al. | 455/567 |
| 2012/0233208 A1 | 9/2012 | Belz et al. | |
| 2012/0275432 A1* | 11/2012 | Lei | H04W 36/0022 370/331 |
| 2013/0287199 A1 | 10/2013 | Wu et al. | |

OTHER PUBLICATIONS

International Preliminary Report on Patentability with Written Opinion for International Application No. PCT/US2011/023721; Date of Mailing Sep. 7, 2012; 5 pages.

Nagarajan, Ramesh et al., Next-Generation Access Network Architectures for Video, Voice, Interactive Gaming, and Other Emerging Applications: Challenges and Directions, Bell Labs Technical Journal 13(1), 2008, Alcatel-Lucent, published by Wiley Periodicals, Inc., published online in Wiley InterScience (www.interscience.wiley.com) DOI: 10.1002/bltj.20283, 18 pages.

European Office action for EP Application No. 11704368.7, dated Apr. 18, 2016, 5 pages.

* cited by examiner

PROXY MEDIA SERVICE FOR DIGITAL TELEPHONY

CROSS-REFERENCE TO RELATED APPLICATIONS

This application is a continuation of U.S. patent application Ser. No. 12/712,935, filed on Feb. 25, 2010, the content of which is hereby incorporated by reference in its entirety.

BACKGROUND OF THE INVENTION

1. Field of the Invention

The present invention is in the field of telephony such as digital network telephony (DNT) and Internet Protocol network telephony (IPNT), and pertains particularly to methods and apparatus for serving local media into active telephony sessions.

2. Discussion of the State of the Art

In the art of telephony, the Internet has become an important network for carrying digital network telephony services. For enterprise telephony users, it has become popular to subscribe to hosted telephony services that will provide all of the communications services and capabilities to the subscribing enterprise while maintaining the telephony equipment and software in the network alleviating the responsibility of the enterprise to host or maintain expensive equipment and software.

More recently Voice over Internet Protocol (VoIP) has become a very popular method of voice communications. Carriers provide private branch exchange (PBX) services including VoIP where session initiation protocol (SIP) is used to create and teardown telephony sessions. In this regard, media services that define telephony state events like music on hold (MOH), ring tone, etc. are provided over realtime transport protocol (RTP). That entire media comes into the enterprise over a shared bandwidth connection such as a public section of the Internet. One problem with a lot of media such as MOH is that it uses shared bandwidth and represents a high cost to the subscribing enterprise.

Therefore, what is clearly needed in a hosted SIP PBX environment is a system and methods for localizing telephony media to the subscriber premise. A system such as this would lower the bandwidth requirements over the limited portion of the carrier network.

SUMMARY OF THE INVENTION

The problem stated above is that suitable bandwidth is desirable for shared bandwidth telephony, but many of the conventional means for delivering IP telephony services such as remote hosted IP PBX systems, also create high bandwidth demand for certain media features relevant to telephony. The inventors therefore considered functional elements of an IP telephony service, looking for elements that exhibit realtime interoperability that could potentially be harnessed to provide full telephony service but in a manner that would not create unsustainable loads on shared bandwidth.

Every IP telephony service depends on a certain amount of bandwidth to deliver events and media associated with those events, one by-product of which is compromised services due to outages and shortages of sufficient bandwidth during peak periods of service. Most such telephony systems employ digital servers and hard or soft switches to establish telephony sessions over shared bandwidth channels and to deliver required media over those channels in time with session events. Servers and soft switching elements are typically a part of such apparatus.

The present inventor realized in an inventive moment that if, at the point of session detection at a remote carrier, media required for session events and states could be identified and served to the end telephony device or system using local bandwidth, significant preservation of shared bandwidth would result. The inventor therefore constructed a unique media delivery system for IP telephony that allowed local enterprises to stream the media required in accompaniment with specific telephony session states or events. A significant preservation of shared bandwidth results with no impediment to quality of service for the session created.

Accordingly, in one embodiment of the present invention, a Session Initiation Protocol (SIP) service system is provided, comprising a SIP-enabled soft switch at a telephony service provider, executing code from a coupled machine-readable medium, routing SIP transactions to remote destinations, a media server coupled to the SIP-enabled soft switch storing media including ring tones and music-on-hold for use in progressing transactions, and an interface to a wide-area-network (WAN) for transmitting transactions and media. The SIP-enabled soft switch determines for each transaction from stored data whether media services are to be provided or not provided for that destination, and in the event media services are not to be provided, alters packet data to indicate media services to be provided by a server local to the destination.

In one embodiment of the system the WAN is the Internet network. Also in one embodiment the destination further comprises a plurality of SIP-enabled communication appliances coupled on a local-area-network (LAN) and a telephony border controller (TBC) including a SIP-PBX coupled to a local media server also supported on the LAN, and wherein transactions for the destination are routed to the SIP-PBX, and media services are provided from the local media server according to SIP state of transaction packets as monitored by the SIP-PBX.

In some embodiments the TBC is configurable, enabling users of individual ones of the SIP-enabled communication appliances to designate specific media for use by the individual appliances. The TBC may also provide recording and conferencing services.

In another aspect of the invention a method for providing Session Initiation Protocol (SIP) services is provided, comprising the steps of (a) receiving, at a SIP-enabled soft switch executing code from a coupled machine-readable medium, transactions to be routed to a remote destination via an interface to a wide area network (WAN); (b) determining for each transaction from stored data whether media services are to be provided or not provided for that destination from a media server coupled to the SIP-enabled soft switch; and (c) in the event media services are not to be provided, altering packet data to indicate media services are to be provided by a server local to the destination.

In one embodiment of the method the WAN is the Internet network. Also in one embodiment the destination further comprises a plurality of SIP-enabled communication appliances coupled on a local-area-network (LAN) and a telephony border controller (TBC) including a SIP-PBX coupled to a local media server also supported on the LAN, and wherein transactions for the destination are routed to the SIP-PBX, and media services are provided from the local media server according to SIP state of transaction packets as monitored by the SIP-PBX.

In some embodiments of the method the TBC is configurable, enabling users of individual ones of the SIP-enabled communication appliances to designate specific media for use by the individual appliances. Also the TBC may provide recording and conferencing services.

BRIEF DESCRIPTION OF THE DRAWING FIGURES

DETAILED DESCRIPTION

The inventors provide a unique and dedicated system for practicing hosted IP telephony with local telephony media service according to various aspects of the present invention. The methods and apparatus of the invention are described in an enabling manner below using the specific examples, which may represent more than one embodiment of the invention.

Figure 1:
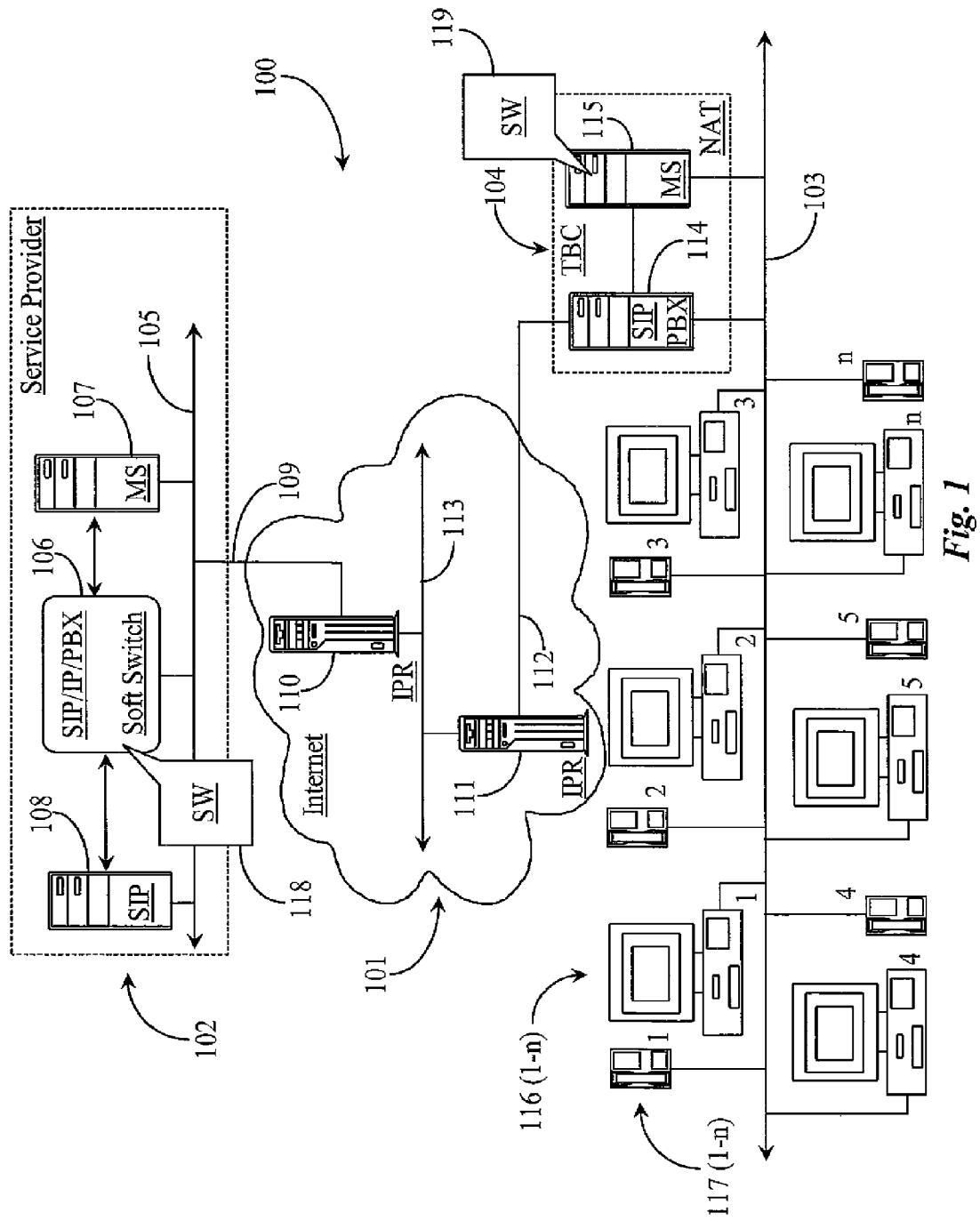
FIG. 1 is an architectural overview of a communications network supporting local media service for telephony according to an embodiment of the present invention.

FIG. 1 is an architectural overview of a communications network 100 supporting local media service for telephony according to an embodiment of the present invention. Communications network 100 includes an enterprise communication center supported by a local area network (LAN) 103. Communications network 100 includes the well-known Internet network 101, which serves in various embodiments as a carrier network for IP telephony. Internet 101 is further defined in this example by a network backbone 113 that represents all of the lines, equipment, and access points that make up the Internet as a whole including any connected sub-networks. Therefore, there are no geographic limitations to the practice of the present invention.

A telephony service provider 102 is illustrated in this example and is supported by a local area network LAN 105. Telephony service provider 102 may be any telephony provider that provides IP telephone services to enterprises and small businesses through a hosted switching facility such as a session initiation protocol (SIP), or Internet protocol (IP) private branch exchange (PBX) soft switch 106. Soft switch 106 has connection to LAN 105 within the physical premise of service provider 102. Service provider 102 provides telephony services, particularly Voice over Internet Protocol (VoIP) telephony services, in a hosted Centrex environment. LAN 105 is enabled for transfer control protocol over Internet protocol (TCP/IP) and other Internet transport and session protocols such as realtime transport protocol (RTP) for transport of media and session initiation protocol (SIP) enabled by SIP server and SIP trunking.

Service provider 102 includes one or more SIP servers 108 and one or more telephony media servers 107 connected to LAN 105. Service provider 102 uses Internet 101 as a carrier for telephony services. SIP server 108 includes a digital machine-readable medium coupled thereto or otherwise accessible thereto that includes all of the software and data required to enable function as a SIP server. Media server 107 includes a digital machine-readable medium coupled thereto or otherwise accessible thereto that includes all of the software and data required to enable function as a telephony media server. Service provider 102 may also include other enabling equipment and servicers such as a voice portal (not illustrated), for example.

Service provider 102 has connection to Internet 101, or more particularly to network backbone 113 by way of an Internet protocol router (IPR) 110 and an Internet access line 109 connected to LAN 105. IPR 110 logically represents a number of potential gateways that may connect the Internet network to the carrier network. Other connection architectures may be used to provide continuous access to Internet 101 as a carrier network for VoIP telephony services without departing from the spirit and scope of the present invention. The illustrated architecture is logical only and may not represent actual physical connections as there may be various connection types and processes observed.

The communication center represented herein by a collection of equipment connected to LAN 103 includes a facility that serves as telephony border controller (TBC) 104. TBC 104 includes a SIP PBX 114 connected to LAN 103 and at least one local telephony media server (MS) 115 also connected to LAN 103. MS 115 has connection to SIP/PBX 114 using a separate high speed digital network line. TBC 104 has connection to Internet 101 by way of an IPR 111 and Internet access line 112. SIP PBX 114 performs network address translation and telephony signaling functions and may be thought of as a SIP proxy server.

LAN 103 supports various SIP-enabled communications devices functioning as end devices or terminals in a SIP telephony network. LAN 103 supports computing terminals 116 (1-n) for practicing telephony. LAN 103 also supports IP/SIP/PBX telephone handsets 117 (1-n). Each handset is associated with a computing terminal as a destination for a SIP call received or as a source for a SIP call to some other destination. Switch 106 may include agent-level routing services for enterprises that do not include a switch and router for internal routing among agents. In such an embodiment all SIP calls destined for the center are routed to final end devices from the point of the hosted switch. However, in one embodiment the enterprise may employ a PBX soft switch, for example a SIP server and internal routing routines for routing to individual end devices.

It is noted herein that LAN 103 may support a wide variety of SIP-enabled end devices including software telephony applications based on connected computing terminals 116 (1-n). Laptops, personal digital assistants, and smart telephone appliances may be represented as connected to LAN 103 and enabled to receive and send SIP transactions. PBX telephone hand-sets 117 (1-n) are illustrated in this example and are associated with computing appliances 116 (1-n). A station for practicing telephony communication may comprise one of computing appliances 116 (1-n) and an associated PBX phone (117 (1-n).

In this example, the Internet network 101 is a public network resulting in a limited bandwidth channel between the service provider and the enterprise supported by LAN 103. Customer Premise Equipment (CPE) 104 resides on a private LAN 103 and the internal communications channel is private from the point of IPR 111 to TBC 104 and over LAN 103 to end devices. A software (SW) application 118 is provided to service provider 102 and is resident on PBX soft switch 106. SW application 118 includes a list of all the network addresses of end devices enabled to send and receive telephone communications in a SIP environment. SW application 118 also contains a routine for stopping carrier-based media services (MS 107) from starting and sending telephony media to destination parties of incoming calls destined for any end devices registered on LAN 103. In an embodiment where agent level routing is performed at the customer premise, SW 118 may simply include the address, expressed as a uniform resource indicator (URI) of SIP-PBX 114.

A SW application 119 is provided to TBC 104 and is resident in this example on MS 115. SW 119 is responsible for selecting and starting local telephony services based on detected or reported signaling and session states of SIP telephony sessions in progress between agents operating computing appliances 116 (1-n) and PBX handsets 117 (1-n) and calling parties. In this example, MS 115 is dedicated to provide all of the audible telephony media only to local end devices connected to LAN 103. Calling parties will continue to receive media services from MS 107 unless they are calling from an enterprise premise equipped with a TBC according to an embodiment of the present invention such as TBC 104. In this case the calling party also receives local telephony media services. SW 119 may monitor or listen for pending SIP session states from the point of session initiation (call set-up) to the point of session termination (call teardown).

In one embodiment of the present invention, SW 118 does not prevent MS 107 from starting and delivering telephony media services like music on hold (MOH), ring tones, and so on. Those media services may instead arrive over realtime transport protocol (RTP) to be ignored from the point of IPR 111 or MS 115 and local services from MS 115 may be started and served to local end devices in place of the external media.

In this embodiment SIP is used to set up and tear down multimedia sessions, particularly voice calls, but including voice/video and multi-party conference calls. RTP is used to transport the media streams (voice, video) and telephony media services (ringtones, busy signals, MOH). SIP session description protocol (SDP) identifies the sources of media streams in the packet headers of the SIP packets. It is noted herein that other protocols similar to SIP, like H.323, may be used and network layering for enabling SIP and RTP may vary.

When a SIP invite is received at a SIP-enabled end device or system, also termed a user agent (UA), an acknowledgment is sent back to the originating UA (calling party). SIP signaling for setting up the call legs for the session arrives at SIP PBX 114, which also performs network address translation. At this point, telephony services media may be required so that the parties may hear the state of the call.

For the calling party, MS 107 provides the media services such as ring tone, MOH, busy signal, etc. For the called party, these services are provided by local MS 115. In this regard the local media may be personalized for the called party. All of the media defining state of a call may be personally selected for a SIP address or uniform resource Indicator (URI). Any user of computing appliances 117 (1-n) and, or PBX phones 117 (1-n) may select their own personal telephony state media for local service. In one embodiment SW 119 includes a graphical user interface GUI for enabling user to personalize telephony media served to their personal SIP-enabled device or system.

For an external call, MS 115 may deliver telephony state media locally to the originating UA such as to appliance 116-1 and, or PBX phone 117-1, for example. In this process, SW 118 may recognize the originating UA and may stop remote media server 107 from delivering telephony state media to the calling party end device or system. MS 115 may continue to monitor state of the session from the point of invite through acceptance of the call. For every call state requiring media, MS 115 serves the appropriate media to the calling UA at the appropriate time.

In a carrier-based VoIP system, there may be different ways to disable telephony services media for those parties served locally. In one embodiment, SIP and RTP packet headers are modified to change the source address of the telephony services media for any party identified through automated number identification (ANI) or destination number identification services (DNIS). In this embodiment the local media server is recognized by the carrier and the required media is served locally at the time of SIP service connection.

In one embodiment of the invention, local media is served according to a session state monitor that monitors the local SIP connection from the point of initiation to connection of the parties in conversation. The local media replaces the external media stream, which can be ignored for individual ones of the parties that can be served locally. Each user that may be locally served can personally configure media such as MOH, ring tones, etc. for his or her UA(s).

Figure 2:
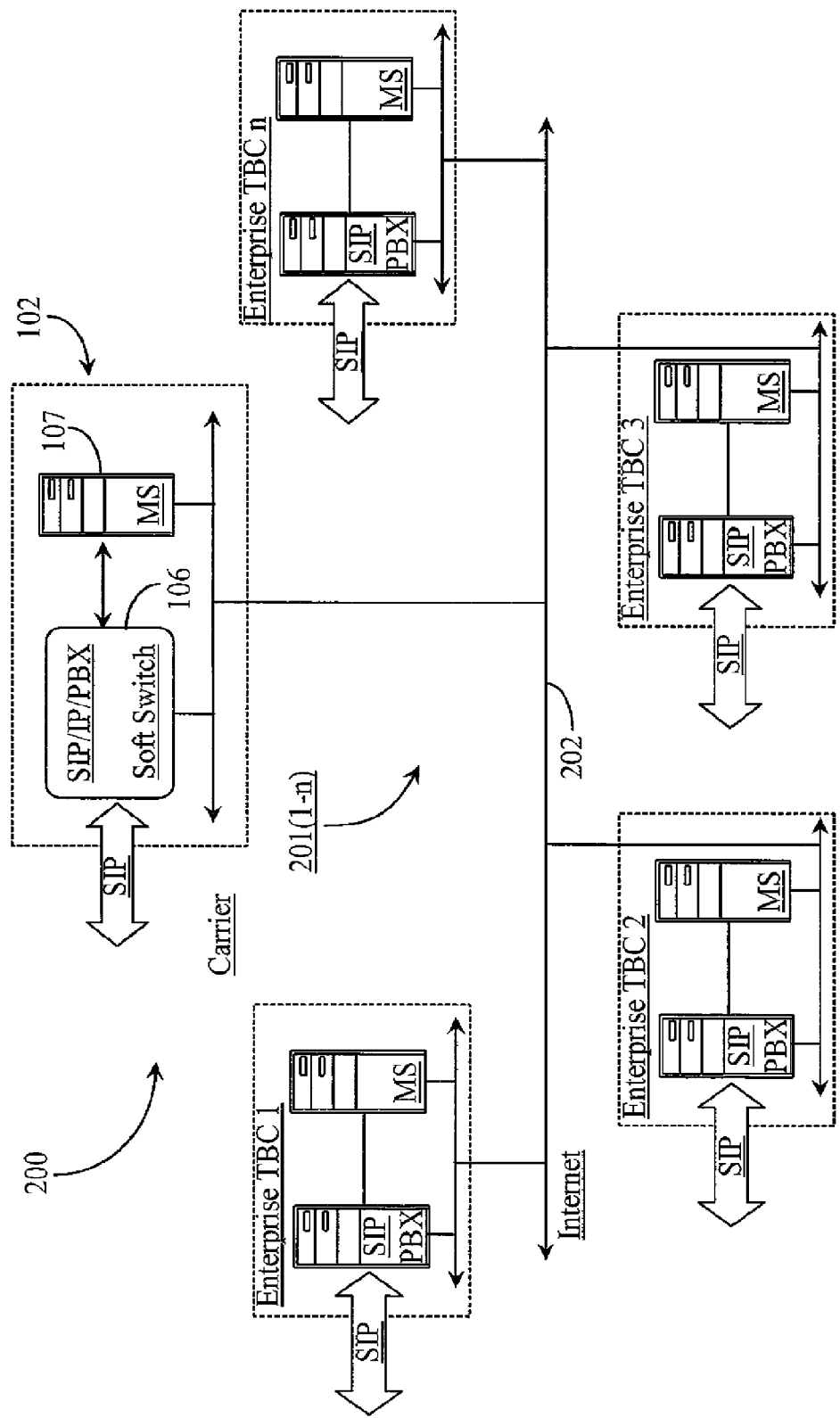
FIG. 2 is an architectural overview of a federated network of communication centers practicing intra-center SIP telephony according to an embodiment of the present invention.

FIG. 2 is an architectural overview 200 of a federated network of communication centers practicing intra-center SIP telephony according to an embodiment of the present invention. Federated network 200 logically represents a grouping of enterprise communications center TBCs 201 (1-n) having connection to Internet backbone 202. In this example the Internet is the carrier network between the various communications centers.

In this example only TBCs of the communication centers are illustrated. In this case each TBC contains a SIP/PBX server that functions as a PBX soft switch and a local media server (MS) adapted to serve local telephony state media as previously described above. In this embodiment, carrier 102 may provide hosted telephony services for the centers represented by TBCs 201 (1-n). Switch 106 may identify by destination number (DN) all of the SIP clients that have a TBC that includes a local telephony state media server (MS). For each center, local telephony state media is served instead of remote hosted telephony state media (MS 107) for all incoming calls. In one embodiment external calls may also utilize local telephony media in place of remote hosted media such as might be served from MS 107.

In this example, each SIP/PBX in a TBC is registered as a telephony switch having a destination number. If carrier 102 is for any reason unable to continue to provide services, incoming calls may be redirected to any of the federated TBCs for routing. In this case calls may be made directly between TBCs whereby the appropriate local telephony state media is served locally for either the called or calling parties.

In one embodiment of the present invention, local users at SIP-enabled end-devices may have aliases published at the central switch, in this case, switch 106 and real names used at the local level where the TBC performs the address mapping.

Local media service is configurable and can include more complex media service such as conference attendant services. Call transfer media, conference call media, voice mail attendant media, and other required state media may be configured by local users. For every session in progress, a monitor detects SIP session state and progression for each SIP session in progress. An SIP session in progress is defined from the point of invite because media may be required actually before the session is connected between two parties. In case of personalized local telephony state media, the appropriate media selection for service to any one SIP session participant may be dependant on automated number identification (ANI) or destination number identification services (DNIS). In this embodiment any enterprise user may call from within the domain of one TBC to another enterprise user the domain of another TBC where both the calling and called parties are served local media and where the Internet serves as a carrier network between the party UAs.

Figure 3:
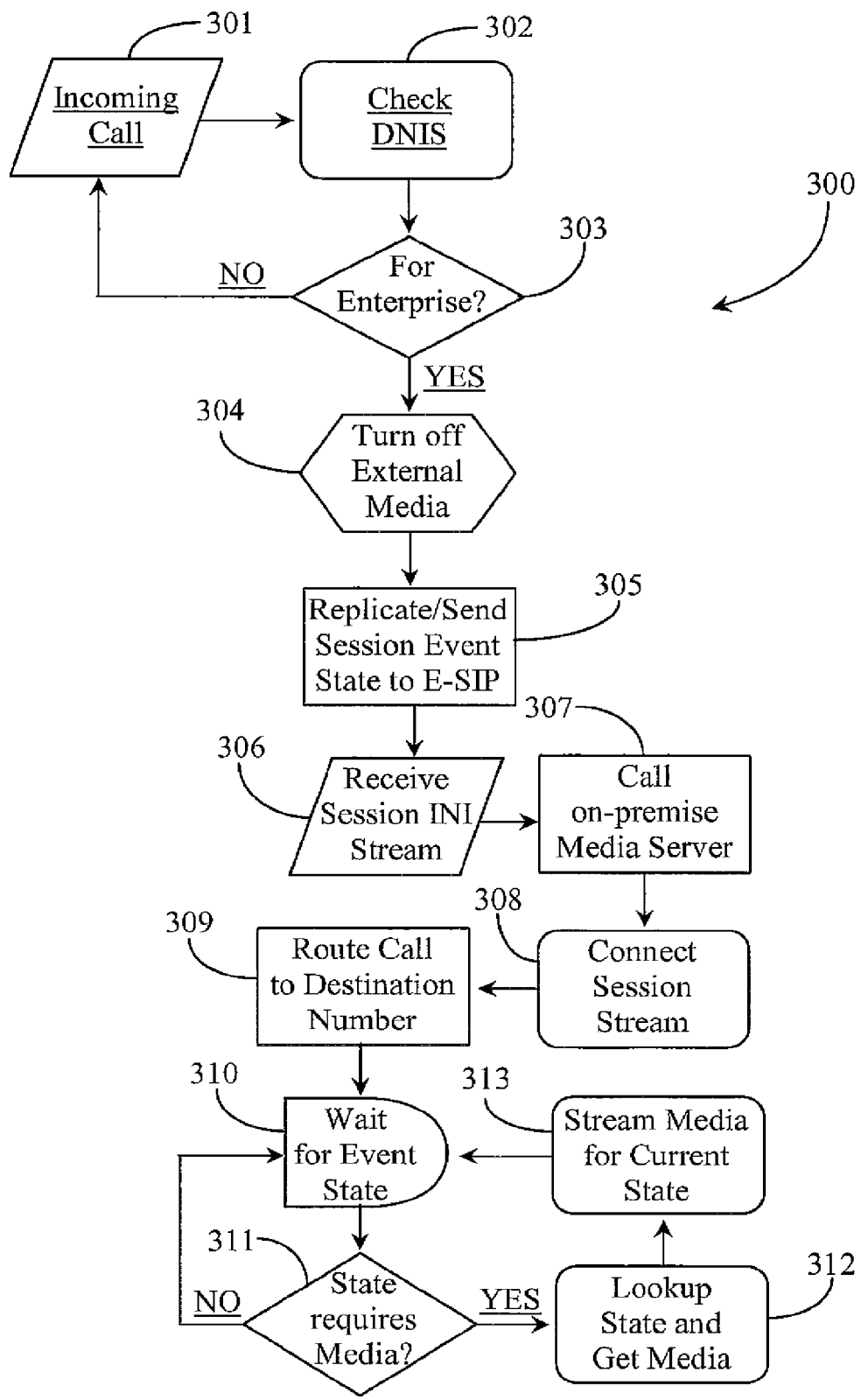
FIG. 3 is a process flow chart illustrating steps for practicing telephony with dedicated local media service according to an embodiment of the present invention.

FIG. 3 is a process flow chart 300 illustrating steps for practicing telephony with dedicated local media service according to an embodiment of the present invention. At step 301, an incoming call is received at a soft switch like SIP/PBX soft switch 106 of FIG. 1. This is a carrier-based switch and could potentially be destined for anywhere in the broader external network. At step 302 the carrier switch checks the destination number dialed by the calling party using such as DNIS. At step 303 the carrier determines if the call is for any registered enterprise that includes a local media server (MS) that is adapted to serve telephony state media like ring tones, MOH, etc.

If at step 303 the incoming call of step 301 is not for a registered enterprise, then the incoming call is directed to an appropriate destination and the process resolves back to step 301 for the next call to process. At step 303, if the switch detects the call is for an enterprise having local state media services, then at step 304, the switch may turn off external media services for the destination party at step 304. This might be accomplished by modifying media source information in both SIP and RTP packet headers going to the destination party. In one embodiment the calling party is also identified as a registered user that has a local telephony state media service. In such as case the carrier hosted media server may not be used at all for serving telephony media services.

In one embodiment of the present invention, SIP connection and progression states are mirrored to an enterprise-based local SIP server at step 305 so that local media may be served as soon as call legs are established. For example, a SIP invite received as the carrier has state replicated to a SIP server in the destination enterprise. Replication may be performed using server state replication software. As the SIP state occurs on the carrier switch, the same state occurs through replication, on the enterprise SIP server.

SW running on the enterprise SIP sever receives the session initiation stream or replication thereof at step 306 and calls the on-premise or local media server for serving local telephony state media to the called party at step 307. At step 308 the replication stream may be connected to the media server. At this point final destination routing might not have occurred yet so the media server does not yet know which media is required. In case further routing is required, the call may be routed to a destination number (UA) at step 309. At this point the media server has the UA number of the SIP-enabled device that will accept the call.

At step 310, a session monitor, perhaps installed in the media server (SW 119), waits for an event state that would require some media. When event state is detected, the monitor determines at step 311 whether the state of the session requires media. For example, a ringing event would require a ring tone, and so on. If at step 311, the monitor determines that the current event state requires no media, the process may loop back to step 310. If at step 311, the current event state requires media, then at step 312, the media server performs a lookup of the state and gets the required media. At step 313, the media server serves the media locally for the called party to hear. The calling party hears external state media from the media server of the carrier. In one embodiment the calling a party resides in an enterprise having a TBC. In this case the calling party may hear its own personalized telephony state media served locally at the calling party's enterprise.

In one embodiment where both the calling party and called party have TBCs in their enterprise architectures, then each may hear their own personalized versions of state media. For example, if one party puts the other party on hold, the on-hold party will hear their own personal MOH. The same is true for the situation in reverse. In this example, a loop of steps 310, 311, 312, and 313, back to step 310 continues until the session is terminated and no more media states exist for the session. In case of a conference bridge, every local party (local to enterprise TBC) may hear local personalized media during conference set-up and during interaction.

In one embodiment of the present invention, local media servers are distributed to UA devices or systems such that the local media already resides on the UA and is executed according to current SIP session state as determined through session state monitoring of an external SIP server or through state replication from an external (carrier-based) SIP server. It is important to note that media services must be synchronized with current states so that, for example, a user hearing a local ring tone cannot pick up the call (handset operation) before the other party is connected. Other potential conflicts could arise if timing of media services delivery is not very close to session state progression relative to events.

It will be apparent to one with skill in the art that the telephony border control system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for providing media services for Internet telephony comprising:
   a processor associated with a second media device; and
   memory coupled to the processor and storing computer instructions therein, wherein the instructions cause the processor to:
   receive, over a wide area network, first media from a first media device, wherein the first media device provides media services to a first communication device; and
   ignore the first media received over the wide area network and instead provide second media to a second communication device over a local area network in place of the first media,
   wherein the first media device is coupled to a switch, wherein the switch is configured to transmit telephony signaling messages directed to the second communication device over the wide area network, and
   wherein the switch is configured to determine whether media services are to be provided or not for a destination associated with the second communication device, and in response to determining that media services are not to be provided, the switch is further configured to transmit packet data for indicating that media services are to be provided by a device local to the destination.

2. The system of claim 1, wherein the signaling messages are session-initiation protocol (SIP) signaling messages.

3. The system of claim 1, wherein the wide area network is a public Internet network.

4. The system of claim 1, wherein second media is configured to be provided by a second media device coupled to the second communication device over the local area network.

5. The system of claim 1, wherein the first and second media devices are configured to provide media selected from a group consisting of a ring tone, music, and busy signaling tone.

6. The system of claim 1, wherein the second media is personalized to a user of the second communication device.

7. A method for providing media services for Internet telephony comprising:
   receiving by a processor associated with a second media device, over a wide area network, first media from a first media device, wherein the first media device provides media services to a first communication device; and
   ignoring, by the processor, first media received over the wide area network and instead providing second media to a second communication device over a local area network in place of the first media,
   wherein the first media device is coupled to a switch, wherein the switch is configured to transmit telephony signaling messages directed to the second communication device over the wide area network, and
   wherein the switch is configured to determine whether media services are to be provided or not for a destination associated with the second communication device, and in response to determining that media services are not to be provided, the switch is further configured to transmit packet data for indicating that media services are to be provided by a device local to the destination.

8. The system of claim 7, wherein the signaling messages are session-initiation protocol (SIP) signaling messages.

9. The method of claim 7, wherein the wide area network is a public Internet network.

10. The method of claim 7, wherein second media is configured to be provided by a second media device coupled to the second communication device over the local area network.

11. The method of claim 7, wherein the first and second media devices are configured to provide media selected from a group consisting of a ring tone, music, and busy signaling tone.

12. The method of claim 7, wherein the second media is personalized to a user of the second communication device.

* * * * *